Aug. 20, 1957  J. M. MIDGLEY ET AL  2,803,360
AIRPLANE JACKING METHOD AND APPARATUS
Filed Oct. 13, 1955
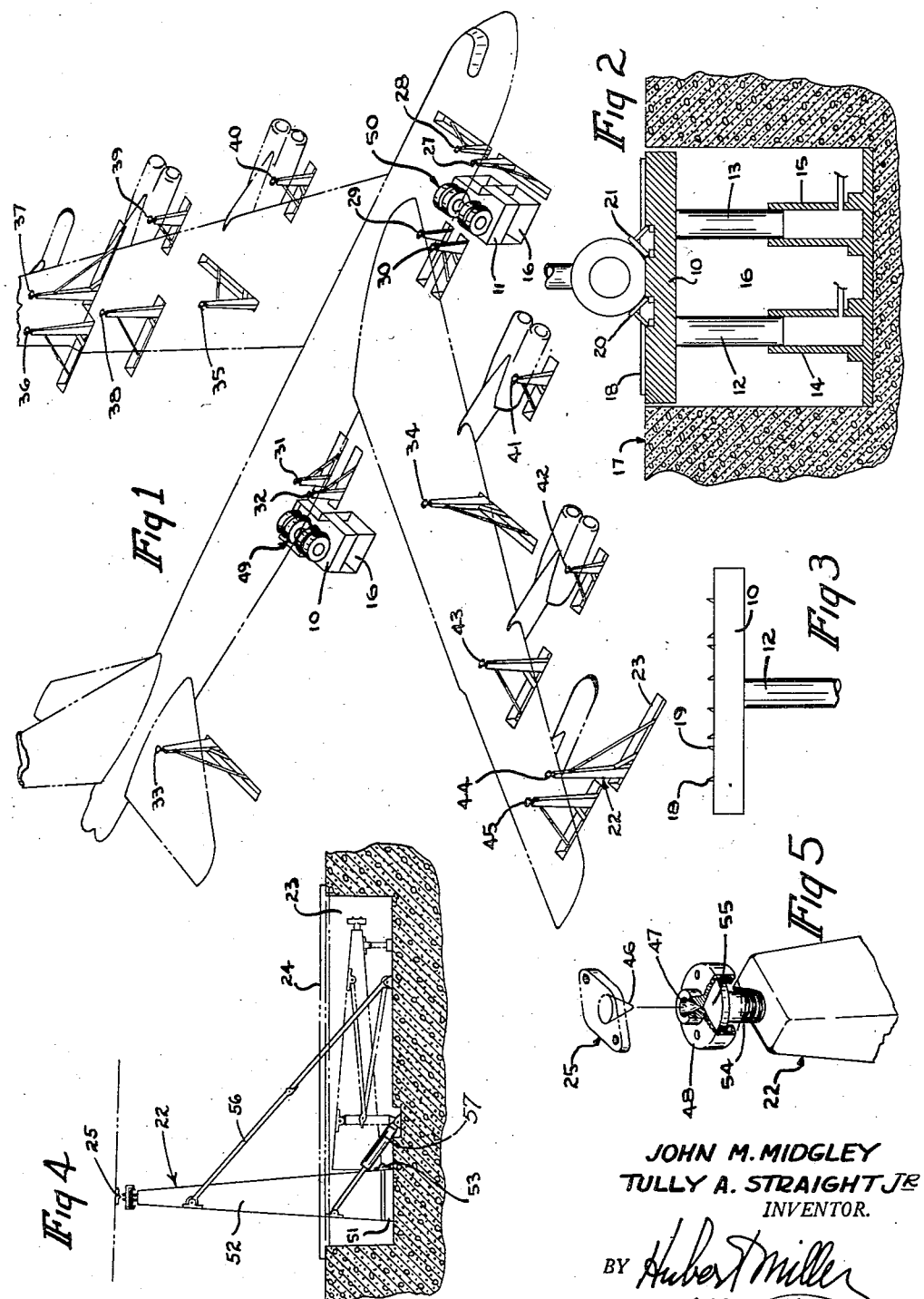
JOHN M. MIDGLEY
TULLY A. STRAIGHT JR
INVENTOR.
BY *Hubert Miller*
ATTORNEY United States Patent Office 2,803,360
Patented Aug. 20, 1957

2,803,360

AIRPLANE JACKING METHOD AND APPARATUS

John M. Midgley and Tully A. Straight, Jr., Wichita, Kans., assignors to Boeing Airplane Company, Wichita, Kans., a corporation of Delaware Application October 13, 1955, Serial No. 540,256

13 Claims. (Cl. 214—152)

This invention relates to an improved method and means for supporting an airplane independent of its several landing gear units, and more particularly to a method and apparatus for transferring the entire weight of an airplane from its several landing gear units to independent blocking or supporting means without the necessity of jacking or bodily raising the entire airplane to a substantially higher level in space than it normally occupies when supported by its several landing gear units.

After the joining of the major components of a large airplane, during its manufacture, the plane is moved periodically through a series of "positions" in the factory. A very considerable amount of work must be done on the airplane in each "position." Because of its weight, any large airplane is necessarily moved from "position" to "position" while supported on its several landing gear units. During work on the plane at each position it is highly desirable, and in some cases absolutely necessary, that the airplane be supported by means other than its landing gear, so that the landing gear units may be retracted or lowered to operative position, as required by the work being conducted on the plane.

It is conventional practice to "roll" or "wheel" the airplane to a desired "position" on its own landing gear units and to then place power jacks beneath the various major components of the plane, and to raise the entire airplane bodily a distance about 4 inches greater than is required to permit full extension of its landing gear hydraulic struts. This amount of "raise" is necessary to permit free retraction and extension of the landing gear units while the plane is supported on its jacks. The actual distance the airplane must be raised varies from eighteen to twenty-four inches, depending on the particular airplane being handled.

To raise a large airplane this distance above the factory floor is a major operation. It requires from fifteen to twenty-one accurately located and spaced jacks. It requires the full time of ten to twelve men for a period of four to five hours. It requires extreme care to prevent any particular jack or jacks from assuming too great a proportion of the total airplane weight at any one time, in which case the airplane could be seriously damaged. In fact this matter of overloading any particular jacking point on the airplane is so important that most manufacturers provide expensive jack manifolding systems and a highly experienced system operator. Furthermore, to permit certain interior installations it is often required that the airplane be "levelled" accurately after it has been raised. This requires considerable additional man-hours, coupled with extreme care against possible damage to the plane due to overloading any one jack point.

The lowering of the airplane from its 18 to 24 inch elevation so that it may be moved to the next assembly line "position" requires the same number of men, about 2 hours time, the same equipment, and the same extreme care.

It is the primary object of this invention to provide a method and apparatus which will eliminate the necessity for raising the airplane substantially above the normal position in space which it occupies when it is supported by its several landing gear units; which will eliminate the need for a large number of power jacks and the expensive manifolding equipment to coordinate their movement; which will eliminate the danger of any jack pad or point on the airplane having too great a proportion of the airplane weight transmitted to it; which will permit four men to transfer the weight of the entire airplane from its several landing gear units to other supporting means in from fifteen to twenty minutes, and to accomplish the reverse transfer in approximately ten minutes, a reduction in required man hours from the conventional jacking method of approximately 97%; which will permit free extension and retraction of the landing gear as in the conventional jacking method; and which accomplishes automatic and accurate "leveling" of the airplane as its weight is transferred.

Another object is to eliminate the time consuming job of placement, removal and storage of the large number of jacks required by the conventional jacking method.

A still further object is to provide a method and apparatus for the purposes mentioned which permit both the wings and the fuselage of an airplane to be supported in their respective construction jig configurations, i. e. with their respective component parts under no greater stress than they were on completion of the respective assemblies in their respective jigs during construction. This means the elimination of wing droop, if desired, and such configuring of the wings and fuselage eliminates excess pressure on pins holding access plates in place, and on latches holding access doors locked, thus permitting easy removal of access plates and opening of access doors during work on the plane.

The invention will be more clearly understood when the following description is read in connection with the accompanying drawings, in which:

Fig. 1 is a perspective view of apparatus embodying the invention, an airplane being shown in broken lines, supported on the apparatus;

Fig. 2 is a fragmentary vertical sectional view showing details of one part of the apparatus shown in Fig. 1;

Fig. 3 is a sectional view of a part of the apparatus shown in Fig. 2, and is taken at 90° from the plane in which the Fig. 2 section is taken;

Fig. 4 is a fragmentary sectional view showing details of another part of the apparatus shown in Fig. 1; and Fig. 5 is a perspective view of the upper end of still another part of the apparatus, showing further details.

Referring to the drawings, the apparatus of the invention includes a plurality of properly located vertically movable landing gear unit supporting platforms, one for each landing gear unit of the particular plane model to be handled. For the plane illustrated, only two platforms 10 and 11 are necessary. Each platform is mounted on the upper ends of coacting hydraulically actuated plungers 12 and 13 mounted in cylinders 14 and 15. A single large cylinder and plunger might well serve the purpose depending on the weight of the airplane to be handled. The platforms are thus reciprocable vertically within respective floor recesses 16, and may be moved upward until their upper surfaces are several inches above the surrounding floor level 17, or retracted until their upper surfaces lie in a plane some thirty inches below floor level. The upper surface of each platform is provided with spaced parallel fore and aft disposed tire guides 18 and 19, and a pair of laterally disposed spaced wheel chocks 20 and 21, which may be nested in corresponding platform recesses, shown in Fig. 2. In the appended claims the terms "platforms" and "vertically movable supporting surfaces" denote similar elements.

Since the method of this invention comprises blocking the various major components of the plane at a desired level with relation to the floor or ground, and then moving the landing gear supporting platforms downward away from the landing gear units to transfer the entire weight of the airplane to the blocking means, one form of blocking means is illustrated in the drawings. Various forms may be used, including scaffolds designed to also serve as blocking means. In the appended claims the terms "blocking means," "weight supporting units," and "upright standards" generally denote similar elements.

The blocking means illustrated in Figs. 1, 4 and 5 are in the form of elongated standards, 22 which when not in use are retractable into respective floor recesses 23, which may be closed with rigid cover plates 24.

As is known by those familiar with this art, airplanes are commonly provided with rigidly attached jack pads 25 attached to the nether surfaces of major components at locations which enable the lifting forces to be transmitted direct to internal structure of the respective components. One standard 22 is located directly beneath each of the primary jacking points on the airplane, as indicated by the numerals 27 to 35 inclusive. The secondary or stabilizing jacking points are located as indicated by the numerals 36 to 45 inclusive. One standard 22 is also located directly beneath each of the indicated stabilizing jacking points, also, all as clearly shown in Fig. 1. It will be noted (Fig. 5) that the jack pads or weight support pads 25 include integral downwardly projecting centering cones 46 which are adapted to seat in complementally shaped recesses 47 in jack pad contacts 48, which are mounted on the respective upper ends of the respective standards 22. Each contact 48 has a limited adjustment in all directions in a plane perpendicular to the long axis of the standard to facilitate seating of the centering cone 46. Care should be taken, however, to locate the standards 22 so that their respective long axes will lie as nearly as possible directly beneath the respective cones 46 when the airplane is supported by its landing gear units 49 and 50 on platforms 10 and 11.

Referring particularly to Fig. 4, the standards 22 include a base 51, and an elongated rigid shell 52 hinged along an axis 53 to one side of the base. The shell is thus capable of being moved from a horizontal dotted line position in its recess 23 to the vertical position shown in solid lines. At its upper end the shell has a threaded longitudinally disposed bore which receives the threaded shank of a rigid support member 54. This permits limited length variation of each standard. On its upper end, support member 54 carries an integral circular plate 55 which seats in a larger diameter circular recess in the jack pad contact 48, thus permitting limited movement of the contact with respect to the plate 55 in a single lateral plane.

A conventional elbow jointed brace 56 serves to stabilize each standard while in its upright position, and also permits retraction and stowing of the standard in its recess 23, as shown. While not essential, I prefer to provide a hydraulic power cylinder 57, with proper controls (not shown), for raising and retracting each standard. It will be understood that the "blocking means" or standards 22 described may be of any desired construction, and do not necessarily have to be located in floor recesses or fixedly mounted to the supporting floor.

Having described the apparatus of the invention, its operation will now be explained.

Operation

The airplane is first towed into position so that the wheels of its main landing gear units are in their respective proper positions on the lift platforms 10 and 11. Proper positioning is aided materially by the tire guides 18 and 19, and by the location of the wheel chocks 20 and 21. The wheels are then chocked, as shown in Fig. 2.

Next the various standards 22 are moved into upright position and their braces 56 locked. The upper end of each standard will thus be positioned immediately beneath a respective jack pad 25. The various jack pad contacts 48 are then adjusted horizontally to position the respective seats 47 in vertical alinement with the jack pad centering cones 46. The support members 54 are adjusted vertically to space the jack pad contacts 48 substantially equidistant from the pads 25.

The platforms 10 and 11 are then lowered slowly until the jack pads make actual contact with the respective standards. Further lowering of the platforms transfers the weight of the entire airplane from its own landing gear units to the blocking means or standards.

To those familiar with this art it will be understood that the above described operation will support the airplane in substantially the same attitude and at substantially the same level in space as it normally occupies while supported on its own landing gear units. This means that the normal "droop" is allowed to remain in the wings and in the aft portion of the fuselage.

On occasion it is desirable that the airplane be supported with its wings and fuselage in the respective configurations which they assumed during assembly in the jigs in which they were built—in other words with the droop removed.

To this end standards 22 of different lengths than those employed in the previously described operation are used. The heights of the various standards are calculated accurately so that as the platforms are lowered the standards at the stabilizing jacking points 36—37 and 44—45 are the first to contact their respective jack pads 25 at those points. This prevents downward travel of the wing tips as the lift platforms 10 and 11 are lowered. Next the jack pads at points 38—39 and 42—43 simultaneously contact and are blocked from further downward movement by their respective standards. As lowering of the platforms 10 and 11 continues the jack pads at points 33, 34, 35, 40 and 41 will contact their respective standards. Finally the jack pads at points 27 through 32 will contact their respective standards and the entire weight of the airplane will be fully transferred to the blocking means or standards as lowering of the landing gear supporting platforms continues. By properly calculating the proper height for each standard the airplane can be automatically "levelled" during this weight transfer method. Furthermore since the weight transfer takes place progressively from the wing tips inward and from the tail forward, the weight of the plane is utilized as a means of forcing the major components into desired configurations without at any time causing any standard to support too great a proportion of the total weight of the airplane. With the wings and fuselage in their respective construction jig configurations the structural strains caused by cantilever supported weight are relieved. In fact, with proper standard height at each jack point this method makes possible the exact duplication of jig configuration so that stress doors, wing close out panels, etc. may be easily removed and replaced while the airplane is thus supported. Such is not possible when the major components are allowed to retain their normal "droop."

The above described apparatus and method are so simple that airplane mechanics, under the direction of competent operators, can handle the airplane safely. The possibility of damage to the airplane due to the supporting of excessive weight at any one or more jacking points is almost completely eliminated. The man-hours required and consequently the cost of the jacking operation, are both reduced very materially. The initial cost is not materially greater than the numerous manifolded jacks required by conventional methods.

Having described the method and the apparatus with sufficient clarity to enable those familiar with this art to construct and use the apparatus and to practice the method, I claim:

1. A method for transferring the weight of an airplane means to support and maintain the various major components thereof in desired relative positions and configurations with respect to each other while maintaining the airplane as a whole at substantially the same relative level in space, comprising: supporting an airplane in the normal manner on its several landing gear units; blocking the various major components of the plane, with the exception of the landing gear units, against lowering in space; and removing support from beneath the several landing gear units to transfer the entire weight of the airplane to the blocking means.

2. A method for transferring the weight of an airplane from its several landing gear units to other supporting means to support and maintain the various major components thereof in desired relative positions and configurations with respect to each other while maintaining the airplane as a whole at substantially the same relative level in space, comprising: supporting an airplane in the normal manner on its several landing gear units; blocking the various major components of the plane against lowering in space, the several landing gear units not being blocked; and lowering the landing gear unit supporting means away from contact with the respective landing gear units to transfer the entire weight of the airplane to the blocking means.

3. A method for transferring the weight of an airplane from its several landing gear units to other supporting means to support and maintain the various major components thereof in desired relative positions and configurations with respect to each other while maintaining the airplane as a whole at substantially the same relative level in space, comprising: supporting the several landing gear units of a landing gear supported airplane on correspondingly located vertically movable coplanar supporting surfaces; blocking the various major components of the airplane against lowering in space; and lowering the said vertically movable supporting surfaces out of contact with the respective landing gear units, the entire weight of the airplane thus being transferred to the blocking means.

4. A method for transferring the weight of an airplane from its several landing gear units to other supporting means to support and maintain the various major components thereof in desired relative positions and configurations with respect to each other while maintaining the airplane as a whole at substantially the same relative level in space, comprising: supporting the several landing gear units of a landing gear supported airplane on correspondingly located vertically movable coplanar supporting surfaces; positioning a number of weight supporting units at desired symmetrically located points beneath the various assembled components of the plane with the upper ends of said units in contact with the various assembled components of the plane at said symmetrically located points; and lowering said vertically movable supporting surfaces away from said several landing gear units to leave the plane supported on said weight supporting units with its various assembled components occupying substantially the same position in space which they occupied when the assembled plane was supported on its several landing gear units.

5. A method for transferring the weight of an airplane from its several landing gear units to other supporting means to support and maintain the various major components hereof in desired relative positions and configurations with respect to each other while maintaining the airplane as a whole at substantially the same relative level in space, comprising: positioning the several landing gear units of a landing gear supported airplane on respective individual correspondingly located vertically movable supporting surfaces which are coplanar, and which are at a level to position the entire plane at the ultimate level at which it is desired to support it; blocking the various components of the airplane at the level and in the configurations in which it is desired to respectively support them; and lowering the vertically movable supporting surfaces out of contact with the respective landing gear units to thus transfer the entire weight of the airplane to the blocking means.

6. A method for transferring the weight of an airplane from its several landing gear units to other supporting means to support and maintain the various major components thereof in desired relative positions and configurations with respect to each other while maintaining the airplane as a whole at substantially the same relative level in space, comprising: supporting the entire airplane solely through its several landing gear units by supporting such units only on correspondingly positioned vertically movable supporting surfaces; raising only the respective outer portions of each wing of the airplane to bend the respective wings upward slightly beyond their normal construction jig configurations; then simultaneously lowering the previously raised portions of said wings as well as certain other portions of the airplane until both the wings and the fuselage assume their respective construction jig configurations; and then supporting the wings and fuselage in their respective construction jig configurations while lowering said movable supporting surfaces away from contact with the respective landing gear units of the plane.

7. A weight transferring and supporting system for airplanes which are provided with weight support pads on the nether surfaces of certain of their components comprising: a supporting surface over which the airplane may be moved while supported by its several landing gear units; a plurality of spaced recesses or pits in said supporting surface, their spacing and respective locations corresponding to the spacing and location of the several landing gear units on the plane to be handled and to the spacing and location of the several weight support pads of said plane; vertically movable airplane supporting platforms mounted in and normally constituting a flush closure for those pits located in positions corresponding to the location of the several landing gear units of the airplane; airplane supporting standards mounted respectively in the remaining ones of said pits and movable from stowed positions therein to upright airplane supporting positions in location corresponding to the respective locations of the several weight support pads on the airplane when the several landing gear units thereof are supported on said platforms flush with the supporting surface; and means to lower said platforms into their respective recesses or pits away from the respective landing gear units to transfer the airplane weight from the landing gear units to said supporting standards.

8. The system described in claim 7 in which the supporting standards have their lower ends hingedly mounted in their respective recesses or pits; and power means housed in the respective pits and connected to the respective standards for moving them into upright airplane supporting positions and for retracting them into stowed positions below the level of the supporting surface.

9. The system described in claim 7 and weight supporting planar flush covers for those pits in which the supporting standards are mounted.

10. The system described in claim 7 in which the lengths of at least some of said supporting standards are such that when they are in upright airplane supporting position and the airplane is supported on its landing gear units on said flush platforms, the upper ends of said standards are substantially in abutting relationship with their respective weight support pads on the airplane.

11. A weight transferring and supporting system for airplanes which are provided with weight support pads on the nether surfaces of certain of their components, comprising: an extensive fixed supporting surface over which the airplane may be moved while supported by its several landing gear units, a plurality of vertically movable jack actuated landing gear unit receiving and supporting platforms mounted in recesses in said fixed supporting surface with their respective upper surfaces normally coplanar with said fixed supporting surface, the spacing and location of said platforms corresponding to the spacing and location of the landing gear units on the particular airplane to be handled; and a plurality of upright weight supporting standards, one located directly beneath each airplane weight support pad when the several landing gear units are located on said platforms, said standards being of such lengths, respectively, that the upper end of each standard extends to a plane immediately adjacent its respective weight support pad while the airplane as a whole is still supported on its several landing gear units on said platforms, whereby when the landing gear unit supporting platforms are lowered each weight support pad contacts and rests on the upper end of its respective upright supporting standard, and the weight of the entire airplane is transferred from its several landing gear units to said upright standards.

12. The system described in claim 11 in which the lengths of the upright standards are such that their respective upper ends are substantially equidistant from the respective weight support pads prior to the lowering of the landing gear unit supporting platforms.

13. Weight supporting and weight transferring apparatus for airplanes which are provided with a plurality of spaced landing gear units, comprising: a plurality of vertically movable substantially horizontal platforms normally located in a common plane in spaced positions corresponding to the relative positions of the several landing gear units of the particular airplane to be handled; a fixed substantially horizontal airplane supporting surface adjoining said platforms and over which the airplane may be moved while supported on its several landing gear units to position said units on respective ones of said platforms for support of the airplane thereby; a plurality of spaced upright fixed length standards supported independent of said platforms and positioned beneath certain major components of the airplane when it is supported by the platforms, the upper ends of the standards respectively terminating immediately adjacent selected localized areas on the nether surfaces of said major components; and means for moving said platforms downward and away from said landing gear units to bring the said selected localized areas on nether surfaces of said airplane components into contact with the upper ends of said standards to thereby transfer the weight of the airplane to said standards alone, and to relieve the landing gear units of such support.

References Cited in the file of this patent
UNITED STATES PATENTS

| | | |
|---|---|---|
| 1,740,021 | Junkers | Dec. 17, 1929 |
| 2,391,510 | Pioch | Dec. 25, 1945 |
| 2,421,512 | Leitch | June 3, 1947 |